(12) United States Patent
Kaplan et al.

(10) Patent No.: US 6,749,309 B1
(45) Date of Patent: Jun. 15, 2004

(54) OPTICAL ELEMENT FOR SCANNING SYSTEM AND METHOD OF MANUFACTURE THEREOF

(75) Inventors: Alvaro Kaplan, Newton, MA (US); Michael B. Nussbaum, Newton, MA (US)

(73) Assignee: GSI Lumonics Corporation, Billerica, MA (US)

( * ) Notice: Subject to any disclaimer, the term of this patent is extended or adjusted under 35 U.S.C. 154(b) by 10 days.

(21) Appl. No.: 09/965,191

(22) Filed: Sep. 27, 2001

(51) Int. Cl.[7] .................................................. G02B 5/08
(52) U.S. Cl. ........................................ 359/883; 359/872
(58) Field of Search ................................ 359/871, 883, 359/846, 896; 428/212

(56) References Cited

U.S. PATENT DOCUMENTS

| | | |
|---|---|---|
| 4,074,416 A | 2/1978 | Rambauske et al. |
| 4,388,728 A * | 6/1983 | Emmanuel .................. 378/34 |
| 4,433,045 A | 2/1984 | Gowan et al. |
| 4,451,119 A | 5/1984 | Meyers et al. |
| 4,482,209 A | 11/1984 | Grewal et al. |
| 4,623,228 A | 11/1986 | Galasso et al. |
| 4,753,504 A | 6/1988 | Kyogoku |
| 4,821,282 A | 4/1989 | Podgorski |
| 4,842,398 A | 6/1989 | Ducassou |
| 4,915,494 A | 4/1990 | Shipley et al. |
| 5,110,422 A | 5/1992 | Alperine et al. |
| 5,233,456 A | 8/1993 | Nelson |
| 5,239,566 A | 8/1993 | Nakamura et al. |
| 6,176,588 B1 | 1/2001 | Davis, Jr. et al. |
| 6,206,531 B1 * | 3/2001 | Williams et al. ............ 359/883 |

* cited by examiner

*Primary Examiner*—Euncha Cherry
(74) *Attorney, Agent, or Firm*—Gauthier and Connors

(57) ABSTRACT

An optical element is disclosed for use in a scanning system. The optical element comprises a carbon-based substrate having a first specific stiffness, and a titanium carbide coating having a second specific stiffness. The carbon-based substrate and the titanium carbide coating form a composite having a desired shape. The composite has a third specific stiffness that is greater than the first specific stiffness and greater than the second specific stiffness.

18 Claims, 7 Drawing Sheets

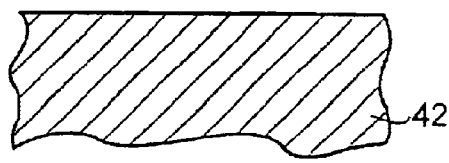
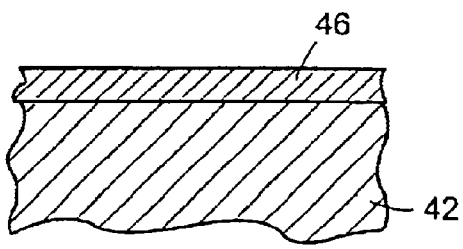
FIG. 8A                FIG. 8B
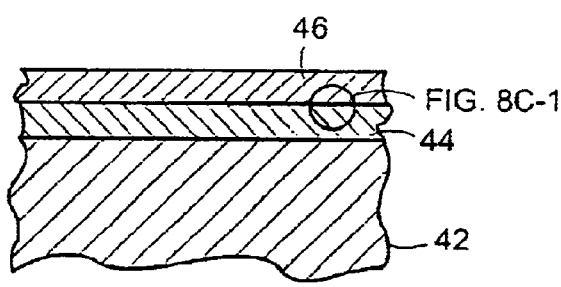
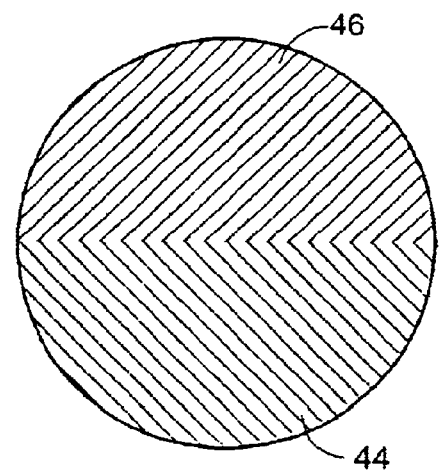
FIG. 8C                FIG. 8C-1
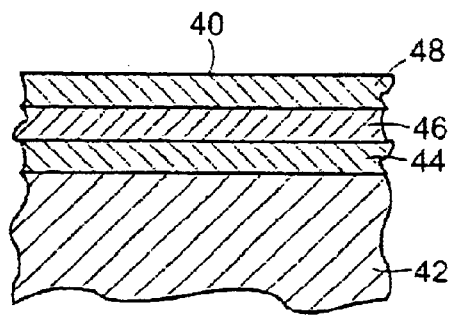
FIG. 8D

OPTICAL ELEMENT FOR SCANNING SYSTEM AND METHOD OF MANUFACTURE THEREOF

BACKGROUND OF THE INVENTION

The invention relates to optical elements for scanning systems, and in particular relates to mirrors for use in multi-directional scanners that are used to position a light beam relative to a target.

Light scanning systems may be used for a wide variety of purposes, such as laser imaging, confocal microscopy, marking, laser drilling, semiconductor processing, and other material processing. For example, multi-directional scanners typically include a plurality of mirrors, each of which is oriented in a different axis. In particular, X–Y scanners may include an X axis mirror that may be rotated with respect to a first axis, and a Y axis mirror that may be rotated with respect to a second axis that is orthogonally disposed to the first axis. Generally, the X axis mirror direct the laser beam across a first range, and the Y axis mirror (which is positioned such that the laser beam contacts the Y axis mirror across the first range) re-directs the laser beam from the X axis mirror across a second range onto a laser application surface. By manipulating the rotational positions of the X axis and Y axis mirrors, it is possible to cover a wide area of laser application surface.

The X and Y axis mirrors in an X–Y scanner must experience large accelerations, and must move with sufficient precision to permit accurate scanning for certain applications such as laser imaging. The maximum speed with which the mirrors may be driven is determined by the maximum rate at which the heavier (typically larger) mirror may be smoothly accelerated. The maximum achievable acceleration of a mirror is essentially limited by the resonant frequency of the mirror since driving the mirror any harder results in imprecise movement. Generally, the larger mirror has a lower resonant frequency and a slower maximum acceleration.

To maximize the rate of acceleration of a mirror, the inertia of the mirror should be as low as possible and the mirror should also be as stiff as possible so that the mirror responds rapidly and precisely to a drive signal. Unfortunately, there is a trade-off between minimizing the weight, and thus, the inertia, of the mirror and maximizing the stiffness of the mirror. The speed and acceleration with which the mirrors may be driven determines how quickly the system may operate to produce a maximum number of, for example, desired marks, images or drill holes per second. If a mirror is driven at an acceleration that excites the resonant frequency of the mirror, then distortion will result.

In current industrial practice, mirrors are typically made of glass, silicon, quartz, and Beryllium. Glass, silicon and quartz all have relatively similar characteristics regarding inertia, and resonant frequency. Beryllium is used in mirrors that must exhibit the highest resonant frequencies and lowest moments of inertia, regardless of cost. Homogenous materials may be characterized as having some density, typically expressed in units of $Kg/m^3$, and a modulus of elasticity or Young's modulus, typically expressed in GPa or $10^9$ $N/m^2$. The ratio of modulus/density is called the specific stiffness of a material. The higher the specific stiffness, the higher the resonant frequency of a given shape. Alternatively, use of a material with a higher specific stiffness allows a lower mass, and thus lower moment of inertia structure to be designed for a given required absolute stiffness. Beryllium has a specific stiffness of 155.3 $10^6$ Nm/kg, vs 31.7 $10^6$ Nm/kg for glass, a ratio of about 5:1. Thus, we would expect that for similarly shaped mirrors, one fabricated from Beryllium would have a significantly higher resonant frequency than would one fabricated from glass.

Additional attributes required of a scanning mirror include good optical qualities, such as surface finish, low cost, and low toxicity. Glass and quartz exhibit all of these properties, while Beryllium exhibits few of them. Beryllium is typically used, therefore, when system speed is a primary consideration. Alternatives to Beryllium for fabricating high speed scanning mirrors have been a subject of considerable investigation. One fruitful focus as been on composite structures—those fabricated of multiple materials, which, together, can exhibit properties superior to those of the component materials.

For example, U.S. Pat. Nos. 4,842,398 and 6,176,588 disclose mirrors formed of composite structures that include honeycomb matrix substrates that are disclosed to be to relatively light weight. U.S. Pat, No. 4,451,119 discloses a composite mirror formed of a three dimensional woven structure of carbon fibers onto which a coating of silicon carbide is applied, followed by a coating of silicon dioxide and then glass, which is polished and then coated with a reflective coating. The '119 patent discloses that the carbon fiber/silicon carbide bond, the silicon carbide/carbon dioxide bond, and the carbon dioxide/glass bond all provide strong adhesion. The use of the multiple layers, however, generally requires multiple processing steps.

U.S. Pat. No. 5,110,422 discloses a mirror that includes a solid carbon-based substrate onto which a porous pre-deposit material is applied followed by a metal that is deposited onto the porous pre-deposit material. The '422 patent recognizes that it is difficult to adhere metal to graphite, and discloses that the pre-deposit material provides a metal adhesive by which the metal may be joined to the substrate. The pre-deposit material is disclosed in the '422 patent to be carbon or silicon carbide, and is disclosed to be deposited onto the substrate by pyrolytic deposition (at 600° C., 700° C., 1,100° C. or 1,150° C.), or by chemical vapor deposition. The metal is disclosed in the '422 patent to be any of cerium, cobalt, chromium, iron, hafnium, iridium, lanthanum, manganese, molybdenum, nickel, osmium, palladium, platinum, rhodium, ruthenium, silicon, tantalum, thorium, titanium, tungsten or uranium, and to be deposited onto the porous pre-deposit material by electrolytic deposition (at 45° C. or 50° C.), by autocatalytic chemical deposition (at 90° C.), by electrophoretic deposition, or by cementation of a metal foil. The processes disclosed in the '422 patent also require multiple processing steps to apply successive deposits of layers.

There is a need for a scanning system optical element that provides improved stiffness and relatively low inertia.

There is also a need for a scanning system optical element that provides relatively low inertia and a relatively high degree of stiffness, and is economically and efficiently produced with a minimum number of processing steps.

There is further a need for an optical element for a scanning system that provides excellent specific stiffness and is economical and efficient to produce. As used herein, the term specific stiffness with respect to a composite means the ratio of the modulus of elasticity of the composite to the density of the composite, the composite, of course, having a particular shape.

SUMMARY OF THE INVENTION

An optical element is disclosed for use in a scanning system. The optical element comprises a carbon-based substrate having a first specific stiffness, and a titanium carbide coating having a second specific stiffness. The carbon-based substrate and the titanium carbide coating form a composite having a desired shape. The composite has a third specific stiffness that is greater than the first specific stiffness and greater than the second specific stiffness.

BRIEF DESCRIPTION OF THE DRAWINGS

The following description may be further understood with reference to the accompanying drawings in which:

FIGS. 8A–8D show illustrative diagrammatic views of the steps in forming the mirror of FIG. 5;

The drawings are shown for illustrative purposes only, and are not to scale.

DETAILED DESCRIPTION OF THE ILLUSTRATED EMBODIMENTS

It has been discovered that titanium carbide may be formed directly on a carbon-based substrate through a process of chemical vapor deposition of titanium onto the substrate. The titanium carbide may form a skin that substantially encapsulates the carbon-based substrate, yielding a mirror that exhibits a high degree of stiffness and has a low inertia.

Figure 1:
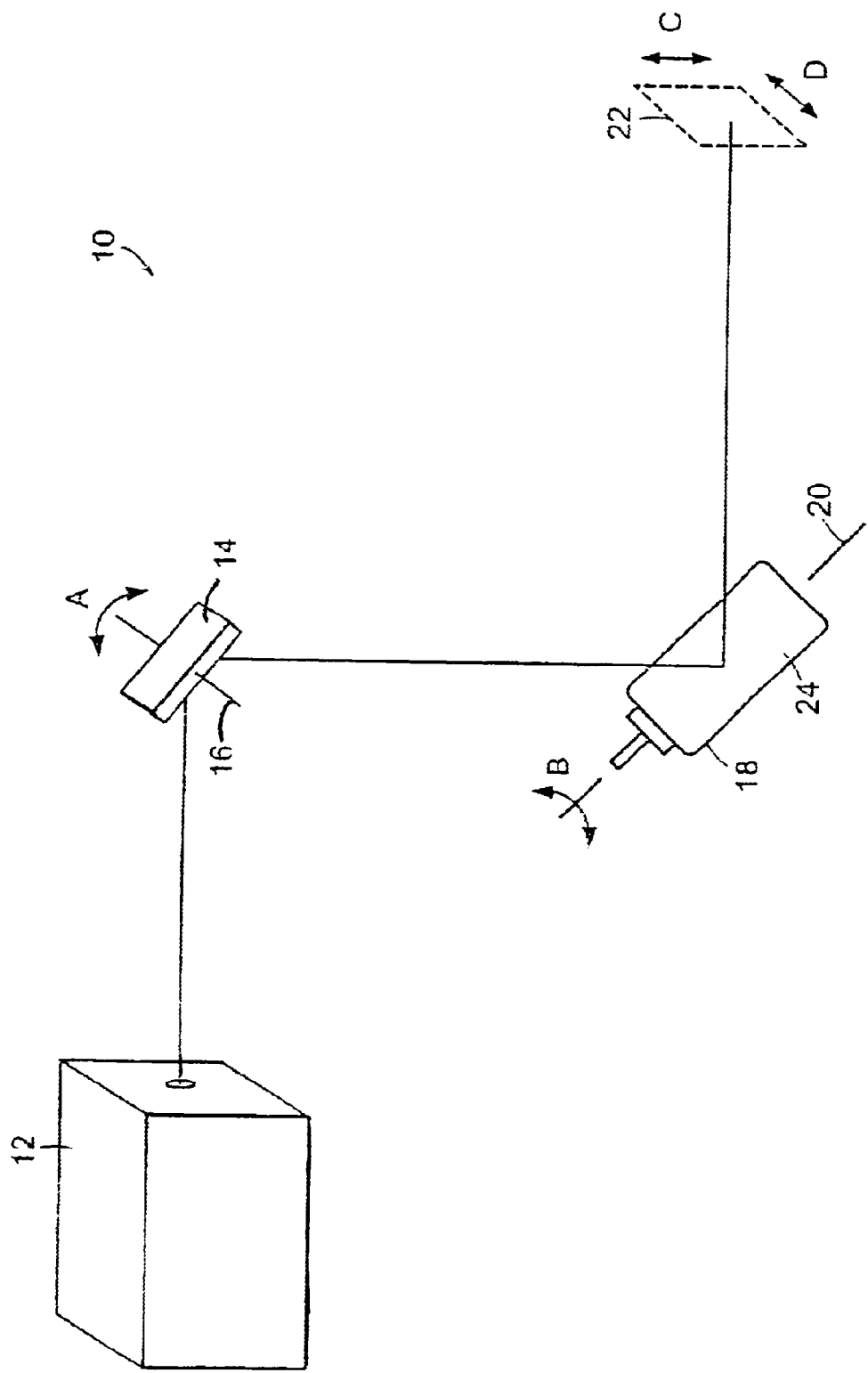
FIG. 1 shows an illustrative diagrammatic view of a mirror of the invention used in a laser scanning system.

As shown in FIG. 1, a laser scanning system 10 in which a mirror of the invention may be used includes a laser sub-system 12 that directs a laser beam toward first mirror 14 that is rotatable about a first axis of rotation 16 as indicated at A. The laser beam is directed from the first mirror 14 toward a second mirror 18 that is rotatable about a second axis of rotation 20 as indicated at B. The second axis of rotation 20 is orthogonally disposed to the first axis of rotation 16. The laser beam is then directed toward an imaging surface 22 (which may or may not be at the focal plane) from a reflective surface 24 of the mirror 18. Placement of the laser beam on the imaging surface 22 may be adjusted in a first direction as indicated at C by adjusting the rotational position of the first mirror 14 as indicated at A, and may be adjusted in an orhogonally disposed second position as indicated at D by adjusting the rotational position of the second mirror 18 as indicated at B. In the laser sub-system and mirrors 14 and 18 may be positioned on a carriage that is moveable with respect to the imaging surface 22.

Figure 2:
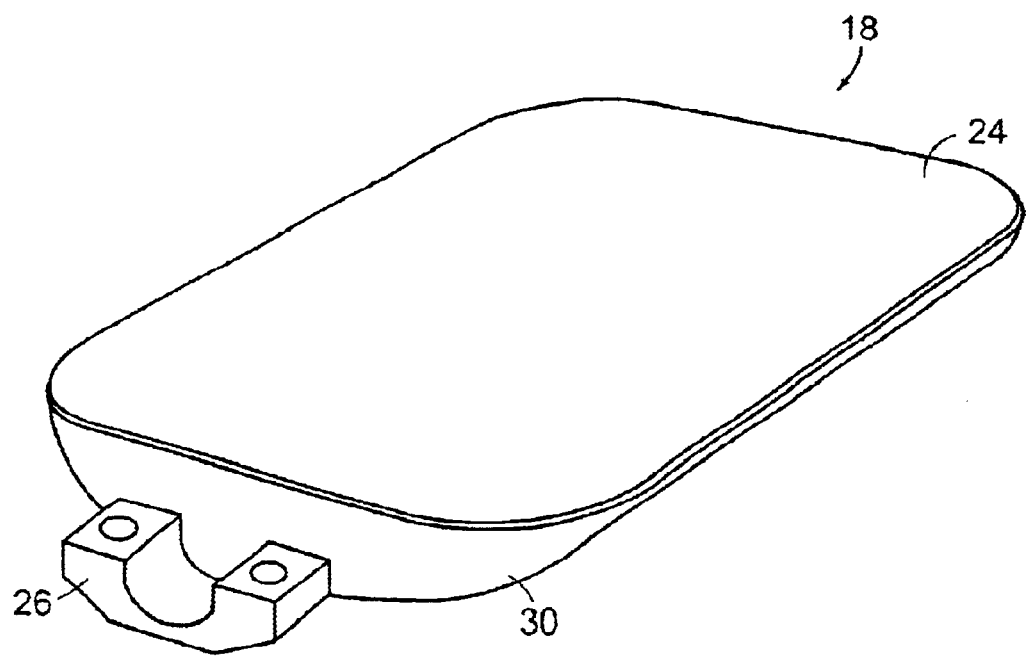
FIG. 2 shows an illustrative perspective view of the top of the mirror shown in FIG. 1.
Figure 3:
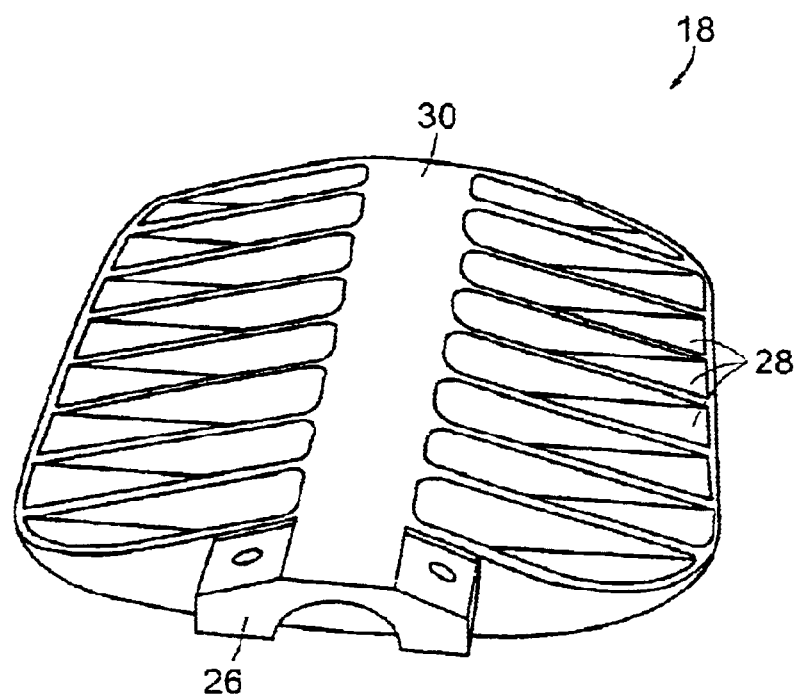
FIG. 3 shows an illustrative perspective view of the bottom of the mirror shown in FIG. 2.

As shown in FIG. 2, the second mirror 18 may include the reflective surface 24 on one side thereof, and may attached to a mirror support structure by a conventional attachment mechanism 26. The underside of the mirror may include cavities 28 that are formed by removing portions from a solid block of a substrate, such as graphite, as shown in FIG. 3 for the purpose of reducing the inertia of the mirror. The portions may be removed by any of a variety of methods such as milling or drilling. In further embodiments, the substrate may be formed by a molding process such as discussed below, or any other method of casting or machining.

Figure 4A:
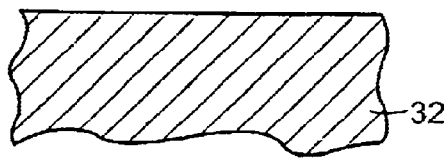
FIGS. 4A–4C show illustrative diagrammatic views of the steps in forming a mirror of the invention.
Figure 4B:
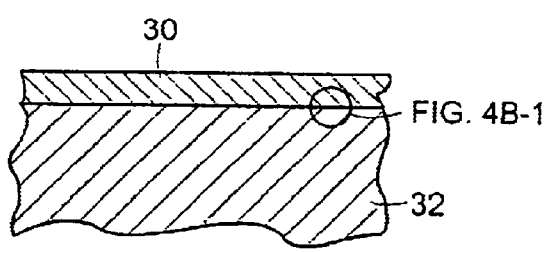
Figures 1, 4B:
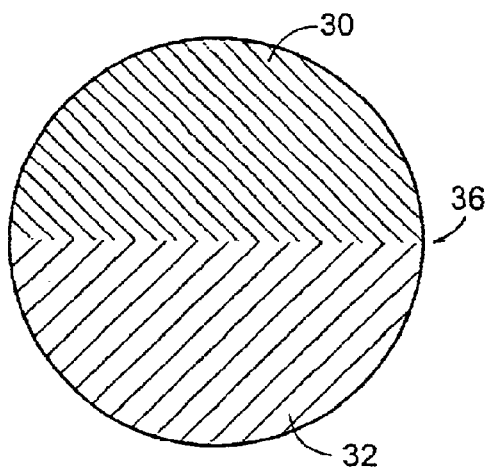
Figure 4C:
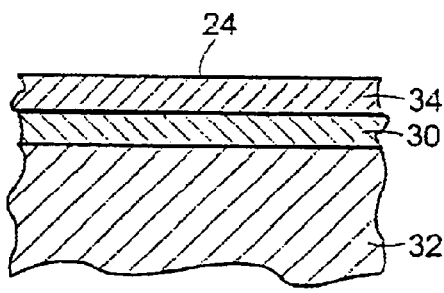

A coating of titanium carbide 30 encases the mirror 18, and on the top surface of the mirror the titanium carbide is polished, and a layer of silver is deposited onto the polished titanium carbide to provide the reflective surface 24 as shown in FIG. 2. In particular, as shown in FIGS. 4A–4C, titanium carbide 30 may be formed on a lap or redress conditioned surface of a solid graphite substrate 32 by chemical vapor deposition at a temperature of at least 3000° F. The exposed surface of the titanium carbide is then polished and coated with silver 34. In other embodiments, gold or any other reflective coating may be employed as the top coat. The silver 34 may further be polished if desired to provide the highly reflective surface 24 of the mirror 18. In further embodiments, a further enhanced reflective coating may be applied.

As shown in the expanded portion of FIG. 4B, titanium carbide is formed at the surface 36 of the graphite 32 and forms a skin coating of about 50 $\mu$m to about 500 $\mu$m, and preferably between about 120 $\mu$m–160 $\mu$m through the process of vaporizing the titanium onto the graphite. It has been discovered that although carbon has a modulus of elasticity of 14.5 Gpa and a density of 1.78 g/cc (specific stiffness=8.15), and titanium itself has a modulus of elasticity of 116 Gpa and a density of 4.5 g/cc (specific stiffness=25.78), the titanium carbide provides improved stiffness having a modulus of elasticity of 450 Gpa and a density of 4.94 g/cc (specific stiffness=91.09). The titanium, which has a melting temperature of 3020° F. (or 1660° C.), should become sufficiently vaporized in the chemical deposition process that it chemically reacts with the graphite to form titanium carbide. The deposition process should preferably be performed at a temperature of at least 3020° F. The resulting titanium carbide also has a higher melting temperature of 5550° F. (or 3065° C.) than the titanium making the mirror well suited for applications involving higher temperature requirements.

Figure 5:
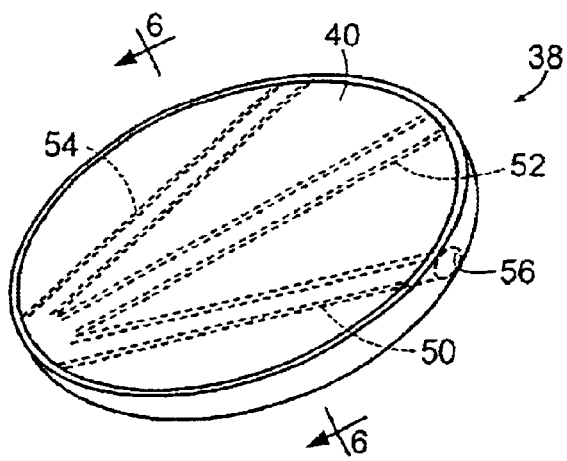
FIG. 5 shows an illustrative perspective view of the top of a mirror in accordance with a further embodiment of the invention.
Figure 6:
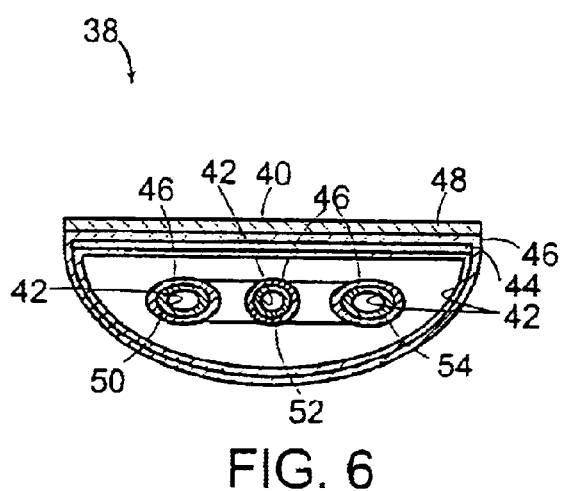
FIG. 6 shows an illustrative side view of the mirror shown in FIG. 5 along line 6—6 thereof.

As shown in FIGS. 5 and 6, a mirror 38 in accordance with a further embodiment of the invention includes a reflective top surface 40 on a core substrate that is formed as a hollow generally egg-shaped shell. The mirror 38 further includes a multi-layer composite under the top surface 40 as is described in further detail below with reference to FIGS. 9A–9D that includes a core substrate 42, a graphite layer 44, a titanium carbide coating 46 that is polished and a silver coating 48 to provide the reflective surface 40. As further shown in FIGS. 5 and 6, the mirror 38 may also include support structures that are formed as passages 50, 52 and 54 through the mirror 38. The passages 50, 52 and 54 provide hollow channels having walls that extend through the mirror 38. The walls of the channels 50, 52 and 54 are formed of the carbon-based substrate 42 that becomes coated with the titanium carbide 46 during the chemical vapor deposition process. The result is a mirror that has a skin of titanium carbide and support structures that run through the mirror that are also formed of titanium carbide. In various embodiments, the channels may run in any of a variety of directions, including end to end and top to bottom, and may extend radially from one end of the mirror. Channels should preferably pass through the outer wall of the optical element creating an opening such as 56 through which titanium may enter the channel to form the titanium carbide coating 46 on the internal wall. Channels that extend to the reflective surface, however, should not pass through the reflective surface because this would cause an opening to appear in the reflective surface.

Figure 7:
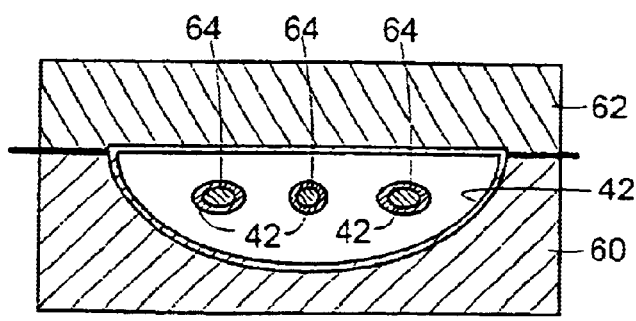
FIG. 7 shows an illustrative side view of the mirror shown in FIG. 5 during molding from the same view as FIG. 6.

As shown in FIG. 7, the core substrate 42 may be formed by a molding process in which liquid dispersed graphite is form molded into the desired shape by mold pieces 60 and 62 as well as insert channel plugs 64 as shown. During the molding process, the graphite becomes attracted to the walls of the mold leaving the hollow cavity with internal support structures. The mold may be spun or agitated to cause the graphite to settle at the inner walls of the mold pieces until cooled and hardened. The molding process should preferably be performed at about 1112° F. (or 600° C.). If any cracking occurs, the cracks may be patched with the liquid dispersed graphite. The substrate 42 is then baked at a temperature of about 2732° F./ (or 1500° C.).

In other embodiments the core substrate may be formed by creating the egg-shaped structure using, for example woven carbon fibers (e.g., a carbon-carbon substrate). If two parts are combined to form the core substrate, then the parts may be bonded together with graphite cement. In further embodiments, the core substrate may be formed of a carbon-carbon honeycomb, carbon foam, aerogel, or graphite beams.

As shown in FIGS. 8A and 8B, a layer of graphite 54 may be bonded to the core substrate using, for example, graphite cement, and, for example, titanium carbide 56 may be deposited onto the graphite layer 54 by chemical vapor deposition as shown in FIG. 8C, again at a temperature of above 3000° F., and preferably above 3025° F. A coating of silver 48 may then be applied as shown in FIG. 8C as discussed above with reference to FIG. 4C. As shown in the expanded portion of FIG. 8C, the graphite material 44 and the titanium chemically react during deposition to form titanium carbide 46 at the surface of the graphite 44.

Figure 9A:
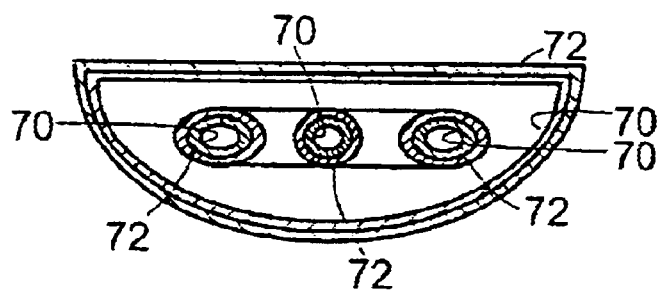
FIGS. 9A–9C show illustrative side views of a similar mirror during various stages of manufacture in accordance with a further embodiment of the invention from the same view as that shown in FIG. 6.
Figure 9B:
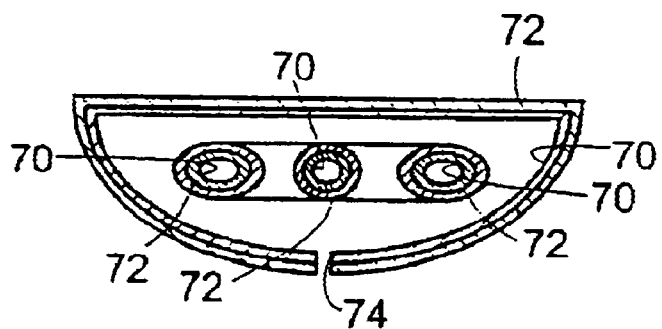
Figure 9C:
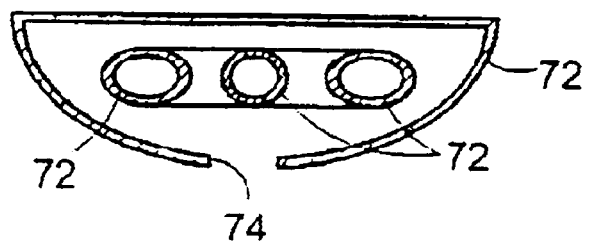

As shown in FIGS. 9A–9C, in accordance with a further embodiment of the invention, a core substrate 70 may be formed by any of a variety of methods, such as that discussed above in connection with FIG. 7. The core substrate 70 may be formed of, for example, graphite, and is coated with a skin of titanium carbide 72 as discussed above. As shown in FIG. 9B, a small hole 74 is then made in the optical element that passes through the titanium carbide layer 72. The optical element is heated to a temperature of about 2732° F. (or 1500° C.) in an oxygen rich atmosphere, and the graphite combusts and exits the element through the opening 74 leaving a shell of titanium carbide only. An exposed surface of this titanium carbide substrate may then be polished and used as an optical element as discussed above.

Figure 10:
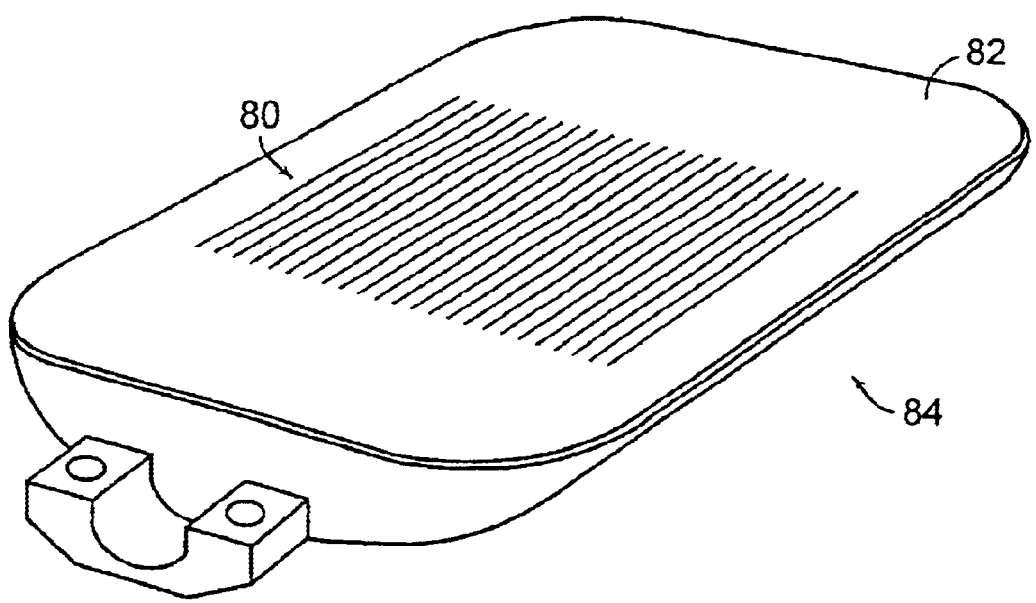
FIG. 10 shows an illustrative perspective view of the top of a mirror in accordance with a further embodiment of the invention including linear gratings.
Figure 11:
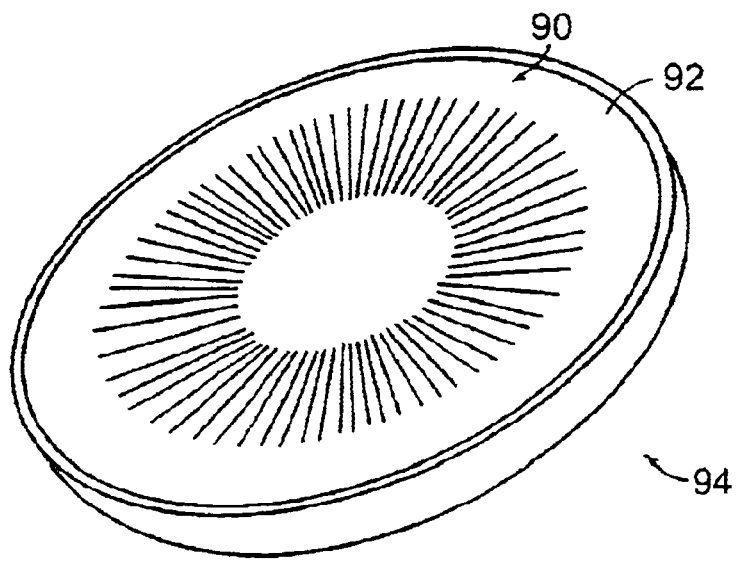
FIG. 11 shows an illustrative perspective view of the top of a mirror in accordance with a further embodiment of the invention including circular gratings.

As shown in FIG. 10, in accordance with a further embodiment of the invention, linear gratings 80 may be applied to the reflective surface 82 of an optical element 84 of the invention that is similar to the mirror shown in FIG. 2, and as shown in FIG. 11, radially extending gratings 90 may be applied to the reflective surface 92 of an optical element 94 of the invention that is similar to the mirror shown in FIG. 5.

Those skilled in the art will appreciate that numerous modifications and variations may be made to the above disclosed embodiments without departing from the spirit and scope of the present invention.

What is claimed is:

1. An optical element for use in a mirror based laser beam positioning system, said optical element comprising:
    a carbon-based substrate and a carbide skin material that substantially encapsulates said carbon based substrate; and
    a highly reflective coating material on at least a portion of said carbide skin material, said highly reflective coating material providing an exposed reflective surface for reflecting an incident laser energy beam and for directing the reflected laser energy beam to at least one location between two positions.

2. An optical element as claimed in claim 1, wherein said carbide skin material includes an exposed polished surface thereof.

3. An optical element as claimed in claim 1, wherein said carbide skin material comprises titanium carbide.

4. An optical element as claimed in claim 1, wherein said carbon based substrate includes internal passages, and said carbide skin material coats said internal passages, thereby forming carbide support structures within said optical element.

5. An optical element as claimed in claim 1, wherein said optical element is reciprocally rotated between said two positions.

6. An optical element for use in a mirror based laser beam positioning system, said optical element comprising:
    a carbide skin material that substantially encapsulates a base substrate, and includes carbide support structures within said optical element, and
    a highly reflective coating material on at least a portion of said carbide skin material, said highly reflective coating material providing an exposed reflective surface for reflecting an incident laser energy beam and for directing the reflected laser energy beam to at least one location between two positions.

7. An optical element as claimed in claim 6, wherein said carbide skin material includes an exposed polished surface thereof.

8. An optical element as claimed in claim 6, wherein said carbide skin material comprises titanium carbide.

9. An optical element as claimed in claim 6, wherein said optical element is reciprocally rotated between said two positions.

10. An optical element of a desired shape for use in a mirror based laser beam positioning system, said optical element comprising:
    a carbide skin material having substantially the same outer shape as the desired shape of the optical element; and
    a highly reflective metallic coating material on at least a portion of said carbide skin material, said highly reflective metallic coating material providing an exposed reflective surface for reflecting an incident laser energy beam and for directing the reflected laser energy beam to at least one location between two positions.

11. An optical element mirror as claimed in claim 10, wherein said optical element further includes carbide support structures within said optical element.

12. An optical element as claimed in claim 10, wherein said optical element is for use in a galvanometer system and is reciprocally rotated between said two positions.

13. An optical element of a desired shape for use in a mirror based laser beam positioning system, said optical element comprising:
   a titanium carbide skin material having substantially the same outer shape as the desired shape of the optical element; and
   a highly reflective metallic coating material on at least a portion of said carbide skin material, said highly reflective metallic coating material providing an exposed reflective surface for reflecting an incident laser energy beam and for directing the reflected laser energy beam to at least one location between two positions.

14. An optical element as claimed in claim 13, wherein said optical element is for use in a galvanometer system and is reciprocally rotated between said two positions.

15. An optical element as claimed in claim 13, wherein the highly reflective metallic coating is silver or gold.

16. A method of forming an optical element for a mirror based laser beam positioning system, said method comprising the steps of:
   providing a carbon-based substrate;
   forming a coating of titanium carbide on said carbon-based substrate by depositing vaporized titanium onto said carbon-based substrate at a temperature of at least 3000° F.; and
   providing a highly reflective coating material on at least a portion of said coating of titanium carbide, said highly reflective coating material providing an exposed reflective surface for reflecting an incident laser energy beam and for directing the reflected laser energy beam to at least one location between two positions.

17. A method as claimed in claim 16, wherein the coating of titanium carbide is formed to a thickness in range of about 50 $\mu$ to about 500$\mu$.

18. A method as claimed in claim 16, wherein said method further comprises the step of polishing an exposed surface of said titanium carbide.

* * * * *